(12) United States Patent
Seely et al.

(10) Patent No.: US 10,954,812 B2
(45) Date of Patent: Mar. 23, 2021

(54) GAS TURBINE BLADE FLUTTER MONITORING AND CONTROL SYSTEM

(71) Applicants: General Electric Company, Schenectady, NY (US); William Forrester Seely, Greenville, SC (US); Xu Fu, Shanghai (CN); Mustafa Tekin Dokucu, Niskayuna, NY (US); Ronghui Zhou, Shanghai (CN)

(72) Inventors: William Forrester Seely, Greenville, SC (US); Xu Fu, Shanghai (CN); Mustafa Tekin Dokucu, Niskayuna, NY (US); Ronghui Zhou, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/905,641

(22) PCT Filed: Dec. 11, 2015

(86) PCT No.: PCT/CN2015/097144
§ 371 (c)(1),
(2) Date: Jan. 15, 2016

(87) PCT Pub. No.: WO2017/096613
PCT Pub. Date: Jun. 15, 2017

(65) Prior Publication Data
US 2018/0274385 A1    Sep. 27, 2018

(51) Int. Cl.
*F01D 21/14*    (2006.01)
*F04D 27/02*    (2006.01)
(Continued)

(52) U.S. Cl.
CPC .......... *F01D 21/14* (2013.01); *F01D 21/003* (2013.01); *F01D 21/04* (2013.01); *F01D 25/06* (2013.01);
(Continued)

(58) Field of Classification Search
CPC .... F01D 21/14; F01D 21/003; F04D 27/0261; F04D 29/665; G01H 13/00;
(Continued)

(56) References Cited

U.S. PATENT DOCUMENTS 4,413,519 A    11/1983 Bannister et al.
5,005,353 A    4/1991 Acton et al.
(Continued)

FOREIGN PATENT DOCUMENTS

| | | | |
|---|---|---|---|
| EP | 2461010 A1 | 6/2012 | |
| JP | 2000220410 A | 8/2000 | |
| WO | WO-2015119706 A2 * | 8/2015 | ............... F02C 9/00 |

OTHER PUBLICATIONS

Thuy, T.L.T. et al., "The Capacitive Pressure Sensor for High Temperature Application: Design and Fabrication," Journal of Emerging Trends in Engineering and Applied Sciences 2 (6), 2011, pp. 1068-1072.
(Continued)

*Primary Examiner* — Robert E Fennema
*Assistant Examiner* — Christopher W Carter
(74) *Attorney, Agent, or Firm* — Fletcher Yoder, P.C.

(57) ABSTRACT

A flutter control system for a turbine includes a processor. The processor is configured to detect blade flutter of a turbine. The blade flutter indicates that blades of the turbine are in a deflected position different from a nominal operating position. The processor is configured to control operational parameters of the turbine that reduce or eliminate the blade flutter to improve the reliability and efficiency of the turbine.

20 Claims, 5 Drawing Sheets

(51) Int. Cl.
| | |
|---|---|
| *F04D 29/66* | (2006.01) |
| *F01D 25/06* | (2006.01) |
| *G01H 1/00* | (2006.01) |
| *F01D 21/04* | (2006.01) |
| *F02C 9/00* | (2006.01) |
| *F01D 21/00* | (2006.01) |
| *G01H 13/00* | (2006.01) |
| *G05B 13/04* | (2006.01) |

(52) U.S. Cl.
CPC ............ *F02C 9/00* (2013.01); *F04D 27/0261* (2013.01); *F04D 29/665* (2013.01); *G01H 1/006* (2013.01); *G01H 13/00* (2013.01); *G05B 13/042* (2013.01); *F05D 2240/24* (2013.01); *F05D 2260/81* (2013.01); *F05D 2260/96* (2013.01); *F05D 2270/11* (2013.01); *F05D 2270/114* (2013.01); *F05D 2270/304* (2013.01); *F05D 2270/312* (2013.01); *F05D 2270/313* (2013.01); *F05D 2270/334* (2013.01); *F05D 2270/54* (2013.01); *F05D 2270/71* (2013.01)

(58) Field of Classification Search
CPC ............... G05B 13/042; F05D 2240/24; F05D 2260/81; F05D 2260/96; F05D 2270/11; F05D 2270/312; F05D 2270/313; F05D 2270/334; F05D 2270/54
USPC ........................................................ 700/280
See application file for complete search history.

(56) References Cited

U.S. PATENT DOCUMENTS

| | | | | |
|---|---|---|---|---|
| 6,195,982 | B1* | 3/2001 | Gysling | F04D 29/668 415/119 |
| 7,762,153 | B2* | 7/2010 | Hoyte | G01M 15/14 73/116.03 |
| 2003/0077163 | A1* | 4/2003 | Eveker | F04D 27/0207 415/1 |
| 2008/0206057 | A1 | 8/2008 | Twerdochlib | |
| 2009/0110541 | A1 | 4/2009 | Southwick et al. | |
| 2014/0156165 | A1* | 6/2014 | Ewens | F02C 9/28 701/100 |
| 2015/0002143 | A1 | 1/2015 | Nishimizu et al. | |
| 2015/0128596 | A1* | 5/2015 | Thompson | F01K 13/02 60/660 |

OTHER PUBLICATIONS

Tan, Q., et al., "A High Temperature Capacitive Pressure Sensor Based on Alumina Ceramic for in Situ Measurement at 600° C.," Sensors, Jan. 30, 2014, 14, pp. 2417-2430.

PCT Search Report and Written Opinion issued in connection with corresponding PCT Application No. PCT/CN2015/097144 dated Sep. 19, 2016.

European Extended Search Report for EP Application No. 15910087.4 dated Jul. 5, 2019; 8 pgs.

* cited by examiner

GAS TURBINE BLADE FLUTTER MONITORING AND CONTROL SYSTEM

CROSS-REFERENCE TO RELATED APPLICATION

This application claims priority and benefit of PCT Patent Application No. PCT/CN2015/097144, entitled "GAS TURBINE BLADE FLUTTER MONITORING AND CONTROL SYSTEM", filed on Dec. 11, 2015, which is herein incorporated by reference in its entirety.

BACKGROUND

The subject matter disclosed herein relates to turbines, and more particularly, to monitoring and/or controlling blade flutter.

Frequently, turbines are used to generate rotational energy from combustion of a fuel. For example, a gas turbine engine combusts a mixture of fuel and air to generate hot combustion gases, which in turn drive one or more turbine stages. The hot combustion gases force turbine blades to rotate, thereby driving a shaft to rotate one or more loads, such as a vehicle or an electrical generator. The electrical generator may be coupled to a power grid to provide power that is used for residential, industrial, or any other suitable purpose.

As the gas turbine rotates, it is desirable for the blades to be located at a desired operating positions at points in time as the blades rotate. However, depending on various operating parameters of the gas turbine, at certain frequencies the blades may be deflected from a respective operating position into a foul position, such as blade flutter. Blade flutter can cause a variety of problems which may have one or more adverse effects on the speed, efficiency, components, and lifetime of the system. It constrains the design and operation of turbines, particularly for design cost reduction and efficiency improvement. For the foregoing reasons, there is a need to address blade flutter in gas turbine systems.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a flutter control system for a turbine includes a processor, wherein the processor is configured to detect blade flutter of a turbine, wherein the blade flutter indicates that blades of the turbine are in a deflected position different from a nominal operating position, and control operational parameters of the turbine that reduce or eliminate the blade flutter to improve the reliability and efficiency of the turbine.

In a second embodiment, a system includes one or more sensors configured to detect signals indicating a location of one or more blades of a turbine, and a control system comprising a processor, wherein the processor is configured to detect blade flutter of one or more blades of a turbine based on the location, wherein the blade flutter indicates that the one or more blades are in a foul deflected position, and control one or more operation parameters of the turbine that reduce or eliminate the blade flutter to improve the reliability and efficiency of the turbine.

In a third embodiment, a non-transitory, computer readable medium comprising instructions configured to he executed by a control system of a gas turbine, the instructions includes instructions to detect blade flutter of one or more blades of the gas turbine, wherein the blade flutter indicates that the one or more blades are in a foul deflected position different from a nominal operating position, and control one or more operational parameters of the gas turbine that reduce or eliminate blade flutter to improve the reliability and efficiency of the turbine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
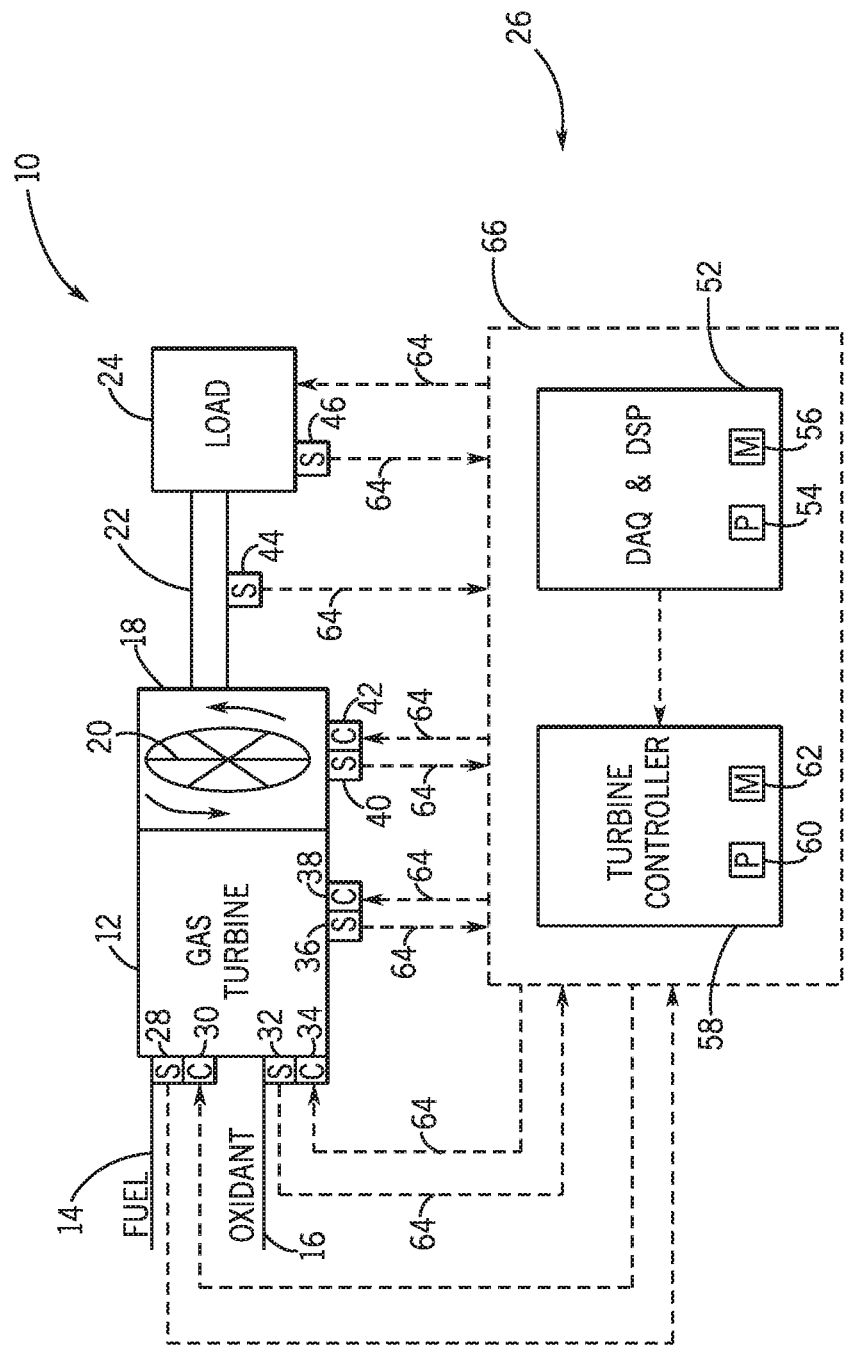
FIG. 1 is schematic diagram of an embodiment of a gas turbine system having a flutter control system.

One or more specific embodiments of the present disclosure will he described below. In an effort to provide a concise description of these embodiments, all features of an actual implementation may not be described in the specification. It should he appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might he complex and time consuming, but would nevertheless he a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The system and method described herein allows for monitoring and/or controlling blade flutter in a gas turbine system. As output on a gas turbine is increased, the turbine may reach one or more operation limitations. When the turbine reaches these limitations, further increases in output may result in blade flutter. Blade flutter may occur when a blade is deflected from a nominal position (e.g., designed or expected position) of the blade and may result in one or more adverse effects on the efficiency, lifetime, and/or components of the turbine system.

Accordingly, a flutter control system may be used to reduce or eliminate blade flutter. The flutter control system may include one or more sensors to detect locations (e.g., angles, positions) of one or more blades of a rotor of the turbine. The flutter control system may access signals from the one or more sensors indicating the locations and determine whether the one or more blades are located in a deflected position different from the nominal position. If the signals indicate that blade flutter has occurred, is occurring, or is likely to occur, the flutter control system may control one or more characteristics of the turbine to alter inputs to reduce and/or eliminate blade flutter. By reducing and/or eliminating blade flutter, the flutter control system may allow the gas turbine to operate at a higher threshold (e.g., higher load conditions) than if the control system did not reduce and/or eliminate blade flutter. For example, higher turbine output may be achieved since the output is not constrained by blade flutter. By reducing and/or eliminating blade flutter, the flutter control system may enable mechanical design margins for extreme events to be reduced, thereby allowing for new designs previously unavailable due to operating limits from blade flutter. Further, the flutter control system may enhance the reliability and life cycle of equipment, parts, or components of the system by monitoring blade flutter. For example, blades of the turbine may have a longer life cycle from reduced blade flutter.

Turning to the figures, FIG. 1 is an example of a power generation system 10 having a gas turbine 12. While a gas turbine 12 is used herein, any turbine with blades suitable for the system 10 described herein may be used, such as a steam turbine. The gas turbine 12 may generate rotational energy by using fuel 14 and an oxidant 16, such as air, compressed air, natural Gas, Syngas, Biodiesel, liquefied natural gas (LNG), etc.). The oxidant 16 may be compressed in a compressor and/or mixed with the fuel of the gas turbine 12. The oxidant-fuel mixture may then be combusted (e.g., ignited, burned) in a combustor. The combustion of the oxidant 16 and fuel 14 may cause a rotor 18 of the turbine 12 to rotate. The rotor 18 may include one or more rotor blades 20 that rotate due to pressure generated from the combustion of the oxidant 16 and fuel 14. The rotor 18 may be coupled to a shaft 22 that is used to provide rotational energy to one or more loads 24. The one or more loads 24 may include a generator to provide electrical power to a power grid, a mobile aircraft or any other load suitable for receiving energy.

The power generation system 10 may include one or more control systems to monitor and control various operations of the turbine 12. For example, the power generation system 10 may include a flutter control system 26 having one or more sensors and/or controls to monitor and/or control operational parameters related to the rotor 18 and/or the blades 20 of the rotor 18. For example, the flutter control system 26 may include one or more sensors 28 and/or controls 30 (e.g., actuators) to control and/or monitor supply of the fuel 14. Similarly, the system 26 may include one or more sensors 32 and/or controls 34 to control and/or monitor supply of the oxidant 16. The flutter control system 26 may also include one or more sensors 36 and/or controls 38 to monitor and/or control various turbine parameters, such as temperatures, speeds, vibrations, and/or pressures. Further, data from the one or more sensors 36 may be used to estimate blade flutter. Similarly, the rotor 18 of the gas turbine 12 may include one or more sensors 40 and/or controls 42 to monitor and/or control rotor parameters (e.g., affecting the blades) related to frequencies, rotational speeds, vibrations, temperatures, pressures. As will be appreciated, the data from sensor 40 may further be used to detect and/or monitor blade flutter of the blades 20. As another example, the shaft 22 of the turbine 12 may include one or more sensors 44 to monitor rotation of the shaft 22. As yet another example, the load 24 may include one or more sensors 46 to monitor various aspects of the load 24, such as power demand, efficiency, or the like.

The flutter control system 26 may receive and/or send signals from and/or to one or more of the sensors 28, 32, 36, 40, 44, and 46 and/or the controls 30, 34, 38, and 42. The flutter control system 26 may include a data acquisition (DAQ) and/or digital signal processing (DSP) system 52 that acquires data from the signals and processes the data with a processor 54 or multiple processors and a memory 56. The flutter control system 26 may also include a turbine controller 58 that processes and controls various aspects of the turbine. For example, the turbine controller 58 may include a processor 60 or multiple processors and a memory 62.

One or more of the processors 54, 60 may be operatively coupled to the memory 56, 62 and configured to execute instructions for carrying out the presently disclosed techniques. These instructions may be encoded in programs or code stored in a tangible non-transitory computer-readable medium, such as the memory 56, 62 and/or other storage. The one or more processors 54, 60 may include a general purpose processor (e.g., processor of a desktop/laptop computer), system-on-chip (SoC) device, or application-specific integrated circuit, or some other processor configuration. The memory 56, 62 may include a computer readable medium, such as, without limitation, a hard disk drive, a solid state drive, diskette, flash drive, a compact disc, a digital video disc, random access memory (RAM), and/or any suitable storage device that enables the processor 54, 60 to store, retrieve, and/or execute instructions and/or data. The memory 56, 62 may include one or more local and/or remote storage devices. The flutter control system 26 may include a wide variety of inputs and/or outputs 64 (i.e. I/O) to monitor and control data from the sensors and/or controls. While the DAQ & DSP system 52 is depicted as a separate unit from the turbine controller 58, the systems may be coupled integrated into a single system as indicated by reference number 66. The processing of the systems 52, 58 may be shared by one or more of the processors 54, 60, may be performed by the same processor, or any suitable method to provide monitoring and control of the power generation system 10, such as control of the rotor 18 and/or blades 20 of the rotor 18.

Figure 2:
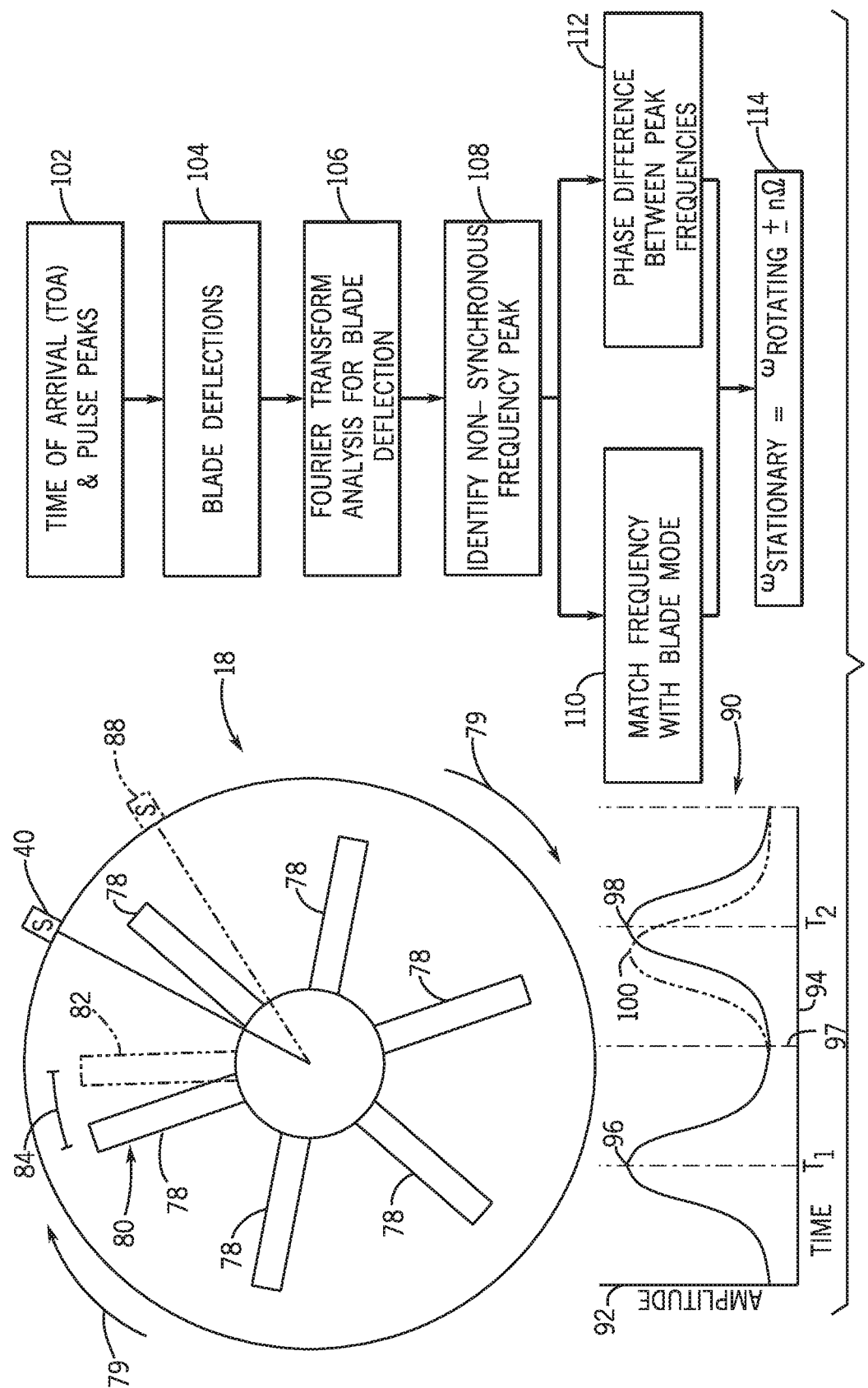
FIG. 2 is a schematic diagram of an embodiment of the flutter control system of FIG. 1 monitoring a rotor of the gas turbine system.

The flutter control system 26 may control one or more characteristics of the turbine 12 to reduce and/or eliminate blade flutter. FIG. 2 is a diagram of an embodiment of the flutter control system 26 for the rotor 18 of the power generation system 10 from FIG. 1. The rotor 18 may include one or more blades 78. One or more portions of the rotor 18 may rotate (e.g., in a clockwise or counter clockwise direction) to provide rotational energy. For example, the blades 78 of the rotor 18 may rotate in a clockwise direction 79. One or more of the blades 78 may be positioned at an operating position as the rotor 18 rotates. The operating position of one blade 78 may be a nominal position where the blade 78 is expected to be at a certain point in time. For example, as each of the blades 78 rotate, each of the one or more blades 78 may be expected to be at a certain angle, location, or position of the rotor 18.

For a variety of reasons, the one or more blades 78 may be deflected from the nominal position, which may have one or more adverse effects on the efficiency, lifetime, and components of the system 10. For example, the one or more blades 78 may be deflected due to vibrations, pressures, or other forces. As shown in FIG. 2, a blade 78 of the rotor 18 is in a deflected position 80 due to vibrations in the system 10. For instance, blade vibration frequencies may increase as rotor 18 speed or load 24 increases. As such, the deflected blade position 80 may be located in a position different from the nominal position 82. The deflection distance could be any distance suitable for detection. For example, the deflection distance 84 as shown in FIG. 2 may be a few centimeters and large enough to cause the one or more adverse effects described herein.

One or more sensors may be used to detect various operating parameters indicative of the deflected blade position 80. For example, the sensor 40 (e.g., probe) may be a magnetic sensor, optical pressure sensor, capacitive sensor, and/or other vibration sensors. While sensors are used in the example with respect to FIG. 2, sensors are merely used as an example, and any suitable method may be used to detect that blade deflection has occurred, is occurring, or is likely to occur. For example, other embodiments may detect blade deflection via statistical patterns based on the speed of the turbine or otherwise indirectly identify blade deflection without the use of direct measurements.

With respect to FIG. 2, the sensor 40 may detect whether the one or more blades 78 are located at an angle, location, or distance at a point in time. In an embodiment, one or more of the processors 54, 60 of the flutter control system 26 may determine an interval between time of arrivals of two blades 78 arriving by (e.g., when a particular blade 78 blade is closest to) the sensor 40. Alternatively and/or additionally, the processors 54, 60 may determine an interval between a blade time of arrival between the sensor 40 and another sensor 88. For instance, a graph 90 of FIG. 2 illustrates amplitude 92 of the signal from one or more of the previously mentioned sensors (e.g. magnetic sensor, optical pressure sensor, capacitive sensor, and/or other vibration sensors) with respect to time 94 of signals that may be received by the sensor 40 and/or the other sensor 88. Although the graph 90 is shown visually, the signal represented in the graph may be processed by the one or more processors 54, 60 and used by the flutter control system 26 described herein without being displayed visually to an operator. Further, the graph 90 may include signals from the sensor 40, sensor 88, or a combination of both. For example, a blade in the nominal position may arrive at the sensor 40 at the peak 96. As time passes (e.g., as shown by time line 97), a blade 78 may be detected as having a deflected blade position 80 (e.g., the blade 78 may arrive at a delayed and/or earlier time than if the blade 78 were in the nominal position). For instance, the deflected blade position 80 may be sensed (e.g., pass the nearest point to the sensor) at the sensor 40 at the time of the delayed peak 98 instead of the desired nominal peak 100. As yet another example, the first peak 96 may indicate when the blade 78 arrives at the first sensor 40 (e.g., before the blade 78 is in the deflected position) and the second peak 98 may indicate when the blade 78 arrives at the second sensor 88 (e.g., after the blade 78 is in the deflected position). The time line 97 is included to represent that a time period may occur before blade flutter begins occurring, such as a time period of milliseconds or microseconds.

One or more of the processors 54, 60 may be used to process data from the one or more sensors 40, 88 to determine that the frequency of a blade detected by a sensor is indicative of a deflected blade position 80. The process described below may be stored in the memory 56, 62 of the flutter control system 26 and executed as instructions by the processor 24 (e.g., running code). The one or more processors 54, 60 may determine the time of arrival (TOA) of the pulse peaks (block 102). The TOA and pulse peaks may be used to determine whether one or more blades 78 are located in a deflected position 80 (block 104). In an embodiment, the one or more processors 54, 60 may perform Fourier transform analysis (e.g., Fast Fourier transform (FFT) analysis) to detect blade deflection (block 106). The processor 54, 60 may then identify blade flutter if the peaks are non-synchronous compared to the TOA of a peak associated with whether the blade 78 was operating in the nominal position. For example, as shown in the graph 90, the peak 98 is non-synchronous compared to the expected TOA of peak 100. As explained above, no sensors, one sensor, or two or more sensors may be used. If a sensor is used, one or more of the processors 54, 60 may be used to match the peak frequency with natural modes the blade 78 (block 110). Alternatively and/or additionally, if two or more sensors are used, one or more of the processors 54, 60 may calculate a phase difference of peak frequencies between the sensor measurements. For example, a nodal diameter n may be defined as the blade vibration cycles in a shaft rotation revolution (e.g. a revolution of the rotor 18). Where $\phi_1$ and $\phi_2$ are the frequency peaks from the FFT analysis in 106 and $\theta_1$ and $\theta_2$ are the physical angles of the sensor locations (e.g., the circumferential location of the sensors), one or more of the processors 54, 60 may calculate the nodal diameter based on the equation:

$$n = \frac{\phi_2 - \phi_1}{\theta_2 - \theta_1} \qquad \text{equation (1)}$$

The nodal diameter may be used by one or more of the processors 54, 60 in an equation to determine the blade vibration frequency $\omega_{rotating}$, such as the equation below:

$$\omega_{stationary} = \omega_{rotating} \pm n\Omega \qquad \text{equation (2)}$$

Whereby $\omega_{stationary}$ is the measured signal frequency and $\Omega$ is the rotor 18 speed or frequency. $\omega_{stationary}$ may be obtained by the time interval between one blade passing two sensors and/or the time interval between two blades passing one sensor. The blade vibration frequency may then be used to determine Whether blade flutter has occurred, is occurring, or is likely to occur.

Figure 3:
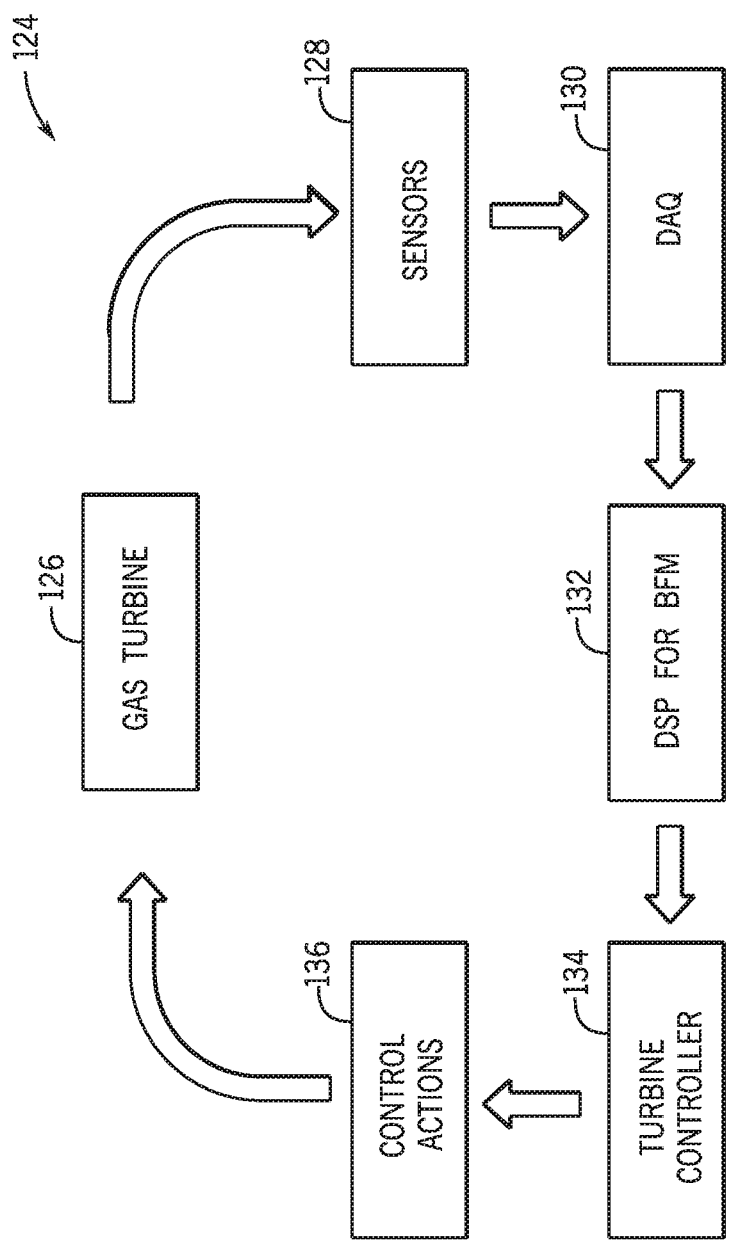
FIG. 3 is a flow diagram of an embodiment of a process performed by the flutter control system of FIG. 1.

As the blades 78, 80 rotate, the flutter control system 26 may be used in a process to reduce and/or remove blade flutter. FIG. 3 is a process 124 performed by the flutter control system 26 to control characteristics of the gas turbine system to reduce and/or eliminate blade flutter. The process described below may be stored in the memory 56, 62 of the flutter control system 26 and executed as instructions by the processor 24 (e.g., running code). The process 124 may begin by monitoring one or more operational parameters of the power generation system 10 (block 126) via one or more sensors 40, 88 (block 128). The sensors 40, 88 may provide signals to a DAQ system (block 130) that is used to acquire data. The acquired signals may then be processed by a DSP system that processes the signals for blade flutter monitoring (block 132). While the DAQ and DSP systems are shown as separate systems and/or processes in FIG. 3, the systems may be combined as shown by reference number 66 in FIG. 1. One or more signals may be sent to the turbine controller (block 134) indicative of whether blade flutter has occurred, is occurring, or is likely to occur. If blade flutter has occurred, is occurring, or is likely to occur, the turbine controller (block 134) may send one or more signals to controls of the turbine to control (block 136) one or more characteristics based on the blade flutter. Depending on the inputs and the signals received by the turbine controller (block 134), the turbine controller (block 134) may control a variety of outputs of the gas turbine 12.

Figure 4:
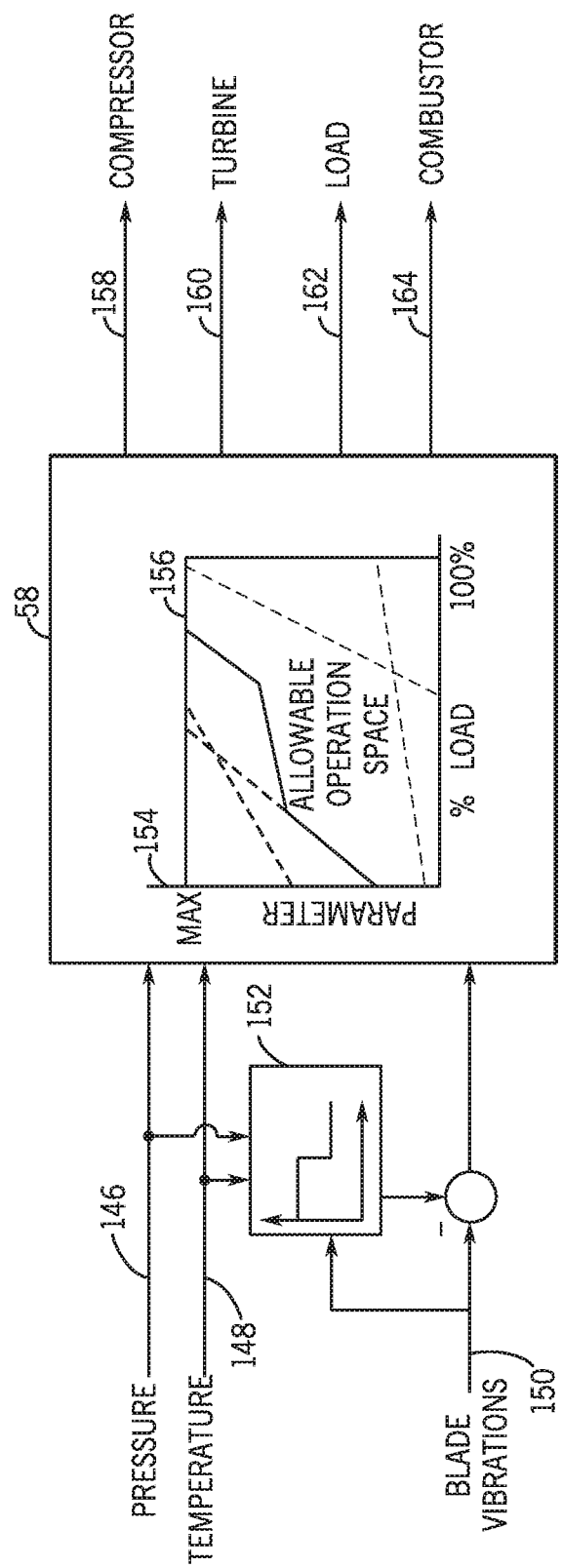
FIG. 4 is a schematic diagram of an embodiment of inputs and/or outputs of the flutter control system of FIG. 1.

FIG. 4 is an example of the inputs and outputs used to control characteristics of the turbine 12 based on the detected blade flutter. The flutter control system 26 receives one or more signals indicating one or more characteristics of the turbine 12, such as pressure 146, temperature 148, speed, ambient conditions, or the like. One or more of the processors 54, 60 may also obtain signals of vibrations, such as blade vibrations 150 that indicate blade flutter. The blade vibration 150 data may be sent to a blade life model 152 that adapts the blade flutter controls based on a life expectancy of the blade. That is, how much life remains in the blade may be used to adapt thresholds (e.g., boundaries) of the blade flutter control system 26. Further, one or more of the processors 54, 60 may update the blade life model 152 based on the blade vibration data. The blade flutter control system 26 may then process the inputs and determine whether blade flutter has occurred, is occurring, or is likely to occur. One or more of the processors 54, 60 may then determine how to adjust one or more operational parameters of the power generation system 10 based on the input pressures 146, temperatures 148 and turbine operation maps 156, to control the system 10 operating within the flutter boundary 152 and keep the system operating with a better system efficiency. Bear in mind that this is merely an example, and any model, pattern, or data may be used to determine that it is desirable to control (increase, decrease, limit, eliminate, etc.) an operational parameter of the power generation system 10. The operational parameter controls may be output to one or more components of the system 10. For example, aspects of the compressor 158, combustor 164, turbine 160, and/or load 162 may be controlled. By controlling these operational parameters and reducing flutter, the flutter control system 26 may allow the power generation system 10 to operate at increased design thresholds.

Figure 5:
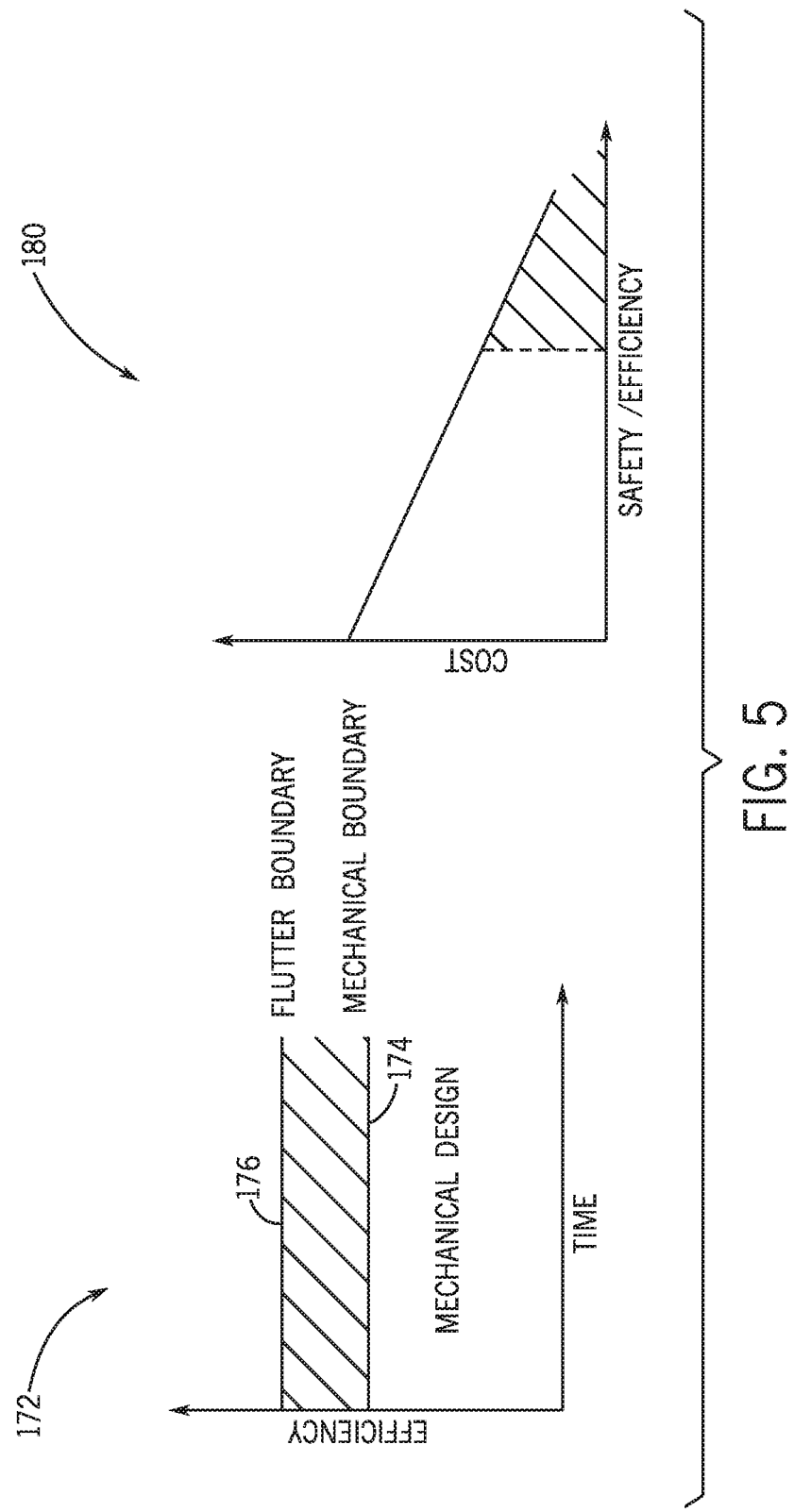
FIG. 5 is a set of graphs of an embodiment of parameters of the flutter control system of FIG. 1.

FIG. 5 is a set of graphs that illustrate the benefits of the disclosed flutter control system. A first graph 172 shows efficiency with respect to time. The flutter control system 26 may allow the gas turbine 12 to operate at increased thresholds. Typically, when blade flutter is not accounted for, the power generation system 10 may operate with an efficiency limited by the mechanical design of the power generation system 10. That is, the system 10 can operate at a first threshold (e.g., mechanical boundary 174) that, when exceeded, may have an increased likelihood of adverse effects, such as blade flutter. In traditional design, an operator may limit output of the system to the first threshold to prevent adverse effects that may require maintenance. With a flutter control system 26, the power generation system 10 may be allowed to operate at a second threshold (e.g., flutter boundary 176) that is associated with greater efficiency than the first threshold. The second threshold may allow the power generation system 10 to operate at an increased operational load, use less fuel, or otherwise generate more energy more efficiently. In other words, by operating with flutter detection, the power generation system 10 can operate with better efficiency as compared to a gas turbine without a flutter detection system. Further, by integrating flutter detection controls within the mechanical design may reduce the mechanical design margin for extreme events, such as blade flutter, and allow for designs beyond previous mechanical limits. Moreover, the reliability and life cycle of components of the power generation system 10 may be enhanced through flutter monitoring. For example, the blades 78 may operate with an extended life cycle by controlling blade flutter.

A second graph 180 shows the design cost with respect to the efficiency of the power generation system 10. As shown in the second graph 180, by operating at the second threshold associated with greater efficiency than the first threshold, the blade flutter control system 26 may allow the power generation system 10 to operate at increased efficiency with reduced design cost.

Technical effects of the disclosure include controlling a gas turbine system for blade flutter. The system may include one or more sensors that sense operational parameters of the gas turbine, such as pressures, temperatures and blade vibrations. Based on these sensed operational parameters, a blade flutter control system may determine that one or more blades of the turbine are operating at a deflected position different from an expected position. The blade flutter control system may then output one or more signals to control one or more parameters of the gas turbine system.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A flutter control system for a turbine, comprising:
   a processor, wherein the processor is configured to:
      detect blade flutter of one or more blades of a turbine based on:
         a Fourier transform analysis of a blade detection signal of the one or more blades from one or more sensors;
         an identification of a non-synchronous frequency peak;
         a match of a peak frequency with natural modes of the one or more blades and/or a calculation of a phase difference between peak frequencies; and
         a calculation of a nodal diameter to identify the blade flutter, wherein the nodal diameter is based on frequency peaks from the Fourier transform analysis and physical angles between one or more sensor locations of the one or more sensors, wherein the blade flutter indicates that the one or more blades of the turbine are in a deflected position different from a nominal operating position; and
      control operational parameters of the turbine to reduce or eliminate the blade flutter in response to detection of the blade flutter.

2. The flutter control system of claim 1, wherein the turbine is configured to operate at a first operating threshold without the control to reduce or eliminate blade flutter due to constraints associated with expected blade flutter, and wherein the control to reduce or eliminate the blade flutter allows the turbine to operate at a second operating threshold greater than the first operating threshold.

3. The flutter control system of claim 2, wherein the processor is configured to adjust the second operating threshold based on a life model of the one or more blades of the turbine.

4. The flutter control system of claim 3, wherein the life model is associated with a remaining life of the one or more blades, wherein the remaining life affects the second operating threshold.

5. The flutter control system of claim 2, wherein the first operating threshold is a mechanical design threshold.

6. The flutter control system of claim 1, wherein the processor is configured to determine a blade vibration frequency of the one or more blades based on the nodal diameter, and detect blade flutter based on the blade vibration frequency.

7. The flutter control system of claim 1, comprising a turbine controller having the processor.

8. The flutter control system of claim 1, wherein the operational parameters comprise a setting of a pressure, a temperature, a fuel, an oxidant, a rotational speed, or any combination thereof.

9. A system, comprising:
one or more sensors configured to obtain a blade detection signal of one or more blades of a turbine; and
a control system comprising a processor, wherein the processor is configured to:
detect blade flutter of the one or more blades of the turbine based on:
a Fourier transform analysis of the blade detection signal of the one or more blades;
an identification of a non-synchronous frequency peak;
a match of a peak frequency with natural modes of the one or more blades and/or a calculation of a phase difference between peak frequencies; and
a calculation of a nodal diameter to identify the blade flutter, wherein the nodal diameter is based on frequency peaks from the Fourier transform analysis and physical angles between one or more sensor locations of the one or more sensors, wherein the blade flutter indicates that the one or more blades are in a deflected position; and
control one or more operation parameters of the turbine to reduce or eliminate the blade flutter in response to detection of the blade flutter.

10. The system of claim 9, wherein the processor is configured to determine a time of arrival of pulse peaks of the blade detection signal of the one or more blades.

11. The system of claim 9, wherein the processor is configured to match the peak frequency with natural modes of the one or more blades.

12. The system of claim 9, wherein the processor is configured to calculate the phase difference between peak frequencies.

13. The system of claim 9, wherein the processor is configured to determine a blade vibration frequency of the one or more blades based on the nodal diameter, and detect blade flutter based on the blade vibration frequency.

14. The system of claim 9, comprising the turbine having the one or more blades.

15. The system of claim 14, comprising a gas turbine engine having the turbine.

16. A non-transitory, computer readable medium comprising instructions configured to be executed by a control system of a gas turbine, the instructions comprising instructions to:
detect blade flutter of one or more blades of the gas turbine based on:
a Fourier transform analysis of a blade detection signal of the one or more blades from one or more sensors;
an identification of a non-synchronous frequency peak;
a match of a peak frequency with natural modes of the one or more blades and/or a calculation of a phase difference between peak frequencies; and
a calculation of a nodal diameter to identify the blade flutter, wherein the nodal diameter is based on frequency peaks from the Fourier transform analysis and physical angles between one or more sensor locations of the one or more sensors, wherein the blade flutter indicates that the one or more blades are in a deflected position different from a nominal operating position; and
control one or more operational parameters of the gas turbine to reduce or eliminate blade flutter in response to detection of the blade flutter.

17. The non-transitory, computer readable medium of claim 16, wherein the instructions further comprise instructions to:
match the peak frequency with natural modes of the one or more blades.

18. The non-transitory, computer readable medium of claim 16, wherein the turbine is configured to operate at a first operating threshold without the control to reduce or eliminate blade flutter due to constraints associated with expected blade flutter, wherein the control to reduce or eliminate the blade flutter allows the turbine to operate at a second operating threshold greater than the first operating threshold, further comprising instructions to adjust the second operating threshold based on a life model associated with remaining life of the one or more blades.

19. The non-transitory, computer readable medium of claim 16, wherein the instructions further comprise instructions to:
calculate the phase difference between peak frequencies.

20. The non-transitory, computer readable medium of claim 16, wherein the instructions further comprise instructions to:
determine a blade vibration frequency of the one or more blades based on the nodal diameter; and
detect the blade flutter based on the blade vibration frequency.

* * * * *